(12) United States Patent
Peterson et al.

(10) Patent No.: US 12,420,692 B2
(45) Date of Patent: Sep. 23, 2025

(54) NO DRILL BRACKETS FOR MOUNTING LOADING RAMPS TO UTILITY VANS

(71) Applicant: National Fleet Products, Inc., Buffalo, MN (US)

(72) Inventors: Steven Peterson, Wayzata, MN (US); Samuel Johnson, Orono, MN (US)

(73) Assignee: National Fleet Products, Inc., Buffalo, MN (US)

( * ) Notice: Subject to any disclaimer, the term of this patent is extended or adjusted under 35 U.S.C. 154(b) by 334 days.

(21) Appl. No.: 18/092,890

(22) Filed: Jan. 3, 2023

(65) Prior Publication Data

US 2023/0211716 A1 Jul. 6, 2023

Related U.S. Application Data

(60) Provisional application No. 63/296,053, filed on Jan. 3, 2022.

(51) Int. Cl.
*B60P 1/43* (2006.01)
*B60R 9/06* (2006.01)

(52) U.S. Cl.
CPC .. *B60P 1/43* (2013.01); *B60R 9/06* (2013.01)

(58) Field of Classification Search
CPC ................ B60P 1/43; B60R 9/02; B60R 9/06
USPC ....... 414/537; 224/545, 555, 557; 248/220.1
See application file for complete search history.

(56) References Cited

U.S. PATENT DOCUMENTS

| | | | | |
|---|---|---|---|---|
| 3,713,553 A * | 1/1973 | Curtis | ............... | B65G 69/30 296/61 |
| 4,021,071 A * | 5/1977 | Norman | ............... | B60R 3/02 280/166 |
| 4,966,516 A * | 10/1990 | Vartanian | ............... | A61G 3/061 14/71.1 |
| 4,979,867 A * | 12/1990 | Best | ............... | B60P 1/43 414/537 |
| 5,026,243 A * | 6/1991 | Dell | ............... | B65G 69/30 224/538 |
| 5,096,362 A * | 3/1992 | Best | ............... | B60P 1/43 182/36 |
| 5,533,771 A * | 7/1996 | Taylor | ............... | B60P 1/435 296/61 |
| 6,241,452 B1 * | 6/2001 | Eekhoff | ............... | B60P 1/43 14/71.1 |
| 10,351,039 B2 * | 7/2019 | Shaffer | ............... | B60P 7/08 |
| 10,391,945 B2 * | 8/2019 | George | ............... | F16B 5/0664 |
| 12,145,539 B2 * | 11/2024 | Peterson | ............... | B60R 3/007 |
| 2015/0375665 A1 * | 12/2015 | Shaffer | ............... | B60P 1/435 414/537 |
| 2023/0150413 A1 * | 5/2023 | Peterson | ............... | B65G 69/28 14/71.1 |

(Continued)

*Primary Examiner* — Justin M Larson
(74) *Attorney, Agent, or Firm* — Skaar Ulbrich Macari, P.A.

(57) ABSTRACT

Brackets for mounting a loading ramp to a utility van without drilling the van's structure can include a horizontal plate portion and a vertical portion. The vertical portion is joined to a perimeter edge of the horizontal portion. The vertical portion includes a main portion and a flange extending from a vertical side of the main portion. Apertures can be provided in the vertical portion and horizontal portions so that the brackets can be secured to the interior of the van without drilling new holes in the van. The brackets are shaped so that the rear doors of the van can close without interference in the normal manner.

19 Claims, 13 Drawing Sheets

(56) References Cited

U.S. PATENT DOCUMENTS

2023/0211716 A1* 7/2023 Peterson .................. B60P 1/43
414/462

* cited by examiner

NO DRILL BRACKETS FOR MOUNTING LOADING RAMPS TO UTILITY VANS

PRIORITY

This application claims priority under 35 U.S.C. § 119 (e) to, and hereby incorporates by reference in its entirety, U.S. Provisional Application No. 63/296,053, filed Jan. 3, 2022.

FIELD

The present invention relates to vehicle accessories, and more particularly, to brackets for mounting loading ramp systems to vans without the need to drill dedicated holes in the van.

BACKGROUND

It is increasingly popular to employ utility vans, such as the Ford Transit, Ram Promaster, Mercedes Benz Sprinter and others, for cargo, utility, passenger and recreational vehicle purposes. However, it is inconvenient and sometimes difficult for persons to load machinery into these types of vans due to their relatively high step-in/out height. For example, a commercial lawn-mowing device would be difficult to load into these types of vans.

It is known to mount ramps or runners to utility vans to facilitate loading. However, mounting such ramps or runners usually requires drilling of specific holes into the van's structure to secure mounting brackets to the van. Doing this can void warranties, reduce resale value and compromise the structure of the van. Thus, there is a continuing need to provide improved ways to mount loading ramps to utility vans.

SUMMARY

Brackets for mounting a loading ramp to a utility van without drilling the van's structure can include a horizontal plate portion and a vertical portion. The vertical portion is joined to a perimeter edge of the horizontal portion. The vertical portion includes a main portion and a flange extending from a vertical side of the main portion. Apertures can be provided in the vertical portion and horizontal portions so that the brackets can be secured to the interior of the van without drilling new holes in the van. The brackets are shaped so that the rear doors of the van can close without interference in the normal manner.

A bracket for mounting accessories to a rear opening of a utility van in certain embodiments can include a horizontal plate portion, comprising a planar surface, a vertical portion extending vertically from a horizontal side of the horizontal plate portion, and a diagonal plate member spanning between the horizontal plate portion and the vertical portion. The vertical portion can include a main portion and a flange. The flange extends horizontally from the main portion from a side edge thereof. The vertical portion includes a plurality of fastener apertures extending horizontally therethrough to receive a male fastener.

A first rail member can be secured to a top surface of the horizontal plate portion. A second rail member can be secured to a top surface of the horizontal plate portion. Each rail member can comprise an elongated rectangular body. The first and second rail members can be oriented parallel to one another. Each of the first and second rail members can include a plurality of threaded apertures defined vertically therein.

The horizontal plate portion and the vertical portion can be formed from a single plate with a bend formed at an interface between the horizontal plate portion and the vertical portion. The bend can be such that it produces a ninety degree angle between the horizontal plate portion and the vertical portion. The vertical portion can be oriented perpendicular to the horizontal plate portion.

The diagonal plate member can be fastened to a front face of the main portion of the vertical portion and to a top surface of the horizontal plate member. The diagonal plate member can form an oblique angle with the horizontal plate portion.

The horizontal plate portion can include a plurality of fastening apertures vertically therethrough adjacent to a far lateral edge of the horizontal plate portion that lies opposite the vertical portion.

A plurality of threaded apertures can be defined vertically in the horizontal plate portion.

A system for mounting a loading ramp to a rear opening of a utility van in certain embodiments can include a first bracket, a second bracket and a plurality of threaded fasteners. The first bracket can include a horizontal plate portion, a vertical portion extending vertically from a horizontal edge of the horizontal plate portion, a diagonal plate member, and a pair of rail members secured to a top surface of the horizontal plate portion and oriented parallel to one another. The vertical portion includes a plurality of fastener apertures extending horizontally therethrough to receive a male fastener. Each of the pair of rail members can comprise an elongated rectangular body. The diagonal plate member can span between the horizontal plate portion and the vertical portion. The second bracket can include a horizontal plate portion and a vertical portion extending vertically from a horizontal edge of the horizontal plate portion. The vertical portion includes a plurality of fastener apertures extending horizontally therethrough to receive a male fastener. A plurality of threaded apertures are defined vertically in the horizontal plate portion. A plurality of threaded fasteners are sized to be placed through the plurality of fastener apertures of the first and second brackets to secure the first and second brackets to the utility van.

The second bracket can further comprise a diagonal plate member spanning between the horizontal plate portion and the vertical portion thereof.

Each of the pair of rail members can include a plurality of threaded apertures defined vertically therein.

The horizontal plate portion and the vertical portion of each of the first and second brackets can be formed from a single plate with a bend formed at an interface between the horizontal plate portion and the vertical portion. The bend can produce a ninety degree angle between the horizontal plate portion and the vertical portion. The vertical portion can be oriented perpendicular to the horizontal plate portion for each of the first and second brackets.

The diagonal plate member of the first bracket can be fastened to a front face of the main portion of the vertical portion and to a top surface of the horizontal plate member. The diagonal plate member of the first bracket can form an oblique angle with the horizontal plate portion.

The horizontal plate portion of the first bracket can include a plurality of fastening apertures vertically therethrough adjacent to a far lateral edge of the horizontal plate portion of the first bracket that lies opposite the vertical portion of the first bracket.

A method of mounting a loading ramp to a rear opening of a utility van without drilling new holes into the utility van is also provided. The method in certain embodiments can include securing a first bracket to a first vertical portion of a door frame of the utility van with a plurality of bolts placed through a vertical portion of the first bracket and extending into factory holes in the utility van, with a horizontal plate portion of the first bracket resting atop a horizontal portion of the door frame of the utility van, securing a second bracket to a second vertical portion of a door frame of the utility van, opposite the first vertical portion of the utility van, with a plurality of bolts placed through a vertical portion of the second bracket and extending into factory holes in the utility van, with a horizontal plate portion of the second bracket resting atop the horizontal portion of the door frame of the utility van, fastening a first bracket of a loading ramp to the first bracket via threaded fasteners placed into respective threaded apertures in a parallel pair of rail members secured to a top surface of the horizontal plate portion of the first bracket, and fastening a second bracket of a loading ramp to the second bracket via threaded fasteners placed into respective threaded apertures defined in the horizontal plate portion of the second bracket.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The invention is to cover all modifications, equivalents, and alternatives falling within the scope of the invention as defined by the appended claims.

The various features or aspects discussed herein can also be combined in additional combinations and embodiments, whether or not explicitly discussed herein, without departing from the scope of the invention.

Referring generally to FIGS. 1-9, a bracket 100 configured for mounting on a driver's side of a van along the frame for the rear doors is shown. The bracket 100 generally comprises a horizontal plate portion 102 and a vertical portion 104. The bottom edge of the vertical portion 104 is joined (e.g. via welding) to a horizontal side edge of the horizontal portion 102. The horizontal plate portion 102 and the vertical portion 104 can be formed of a single piece of material (e.g. metals such as steel or aluminum) that is bent at a ninety degree angle at the edge interface to define the respective portions 102, 104.

The vertical portion 104 includes a main portion 106 and a flange 108 extending from a vertical side of the main portion 106 so that the vertical portion 104 is L-shaped in its top plan view.

A diagonal plate member 110 spans between approximately the mid-height of the vertical portion 104 towards the horizontal plate portion 102 to add strength to the bracket 100. The diagonal plate member 110 is attached (e.g. via welding) to the front face of the main portion 106 of the vertical portion 104 and the top surface of the horizontal plate portion 102.

A plurality of raised rail members 112 are fastened to the top surface of the horizontal plate portion 102. The rail members 112 are oriented parallel to one another. Two rail members 112 are depicted, but alternative embodiments can be provided with more than two rail members or just a single rail member. Each rail member 112 resembles an elongated rectangle or bar shape. Each rail member 112 can be fastened to the top surface of the horizontal plate portion 102 with mechanical fasteners or via welding.

Figure 8:
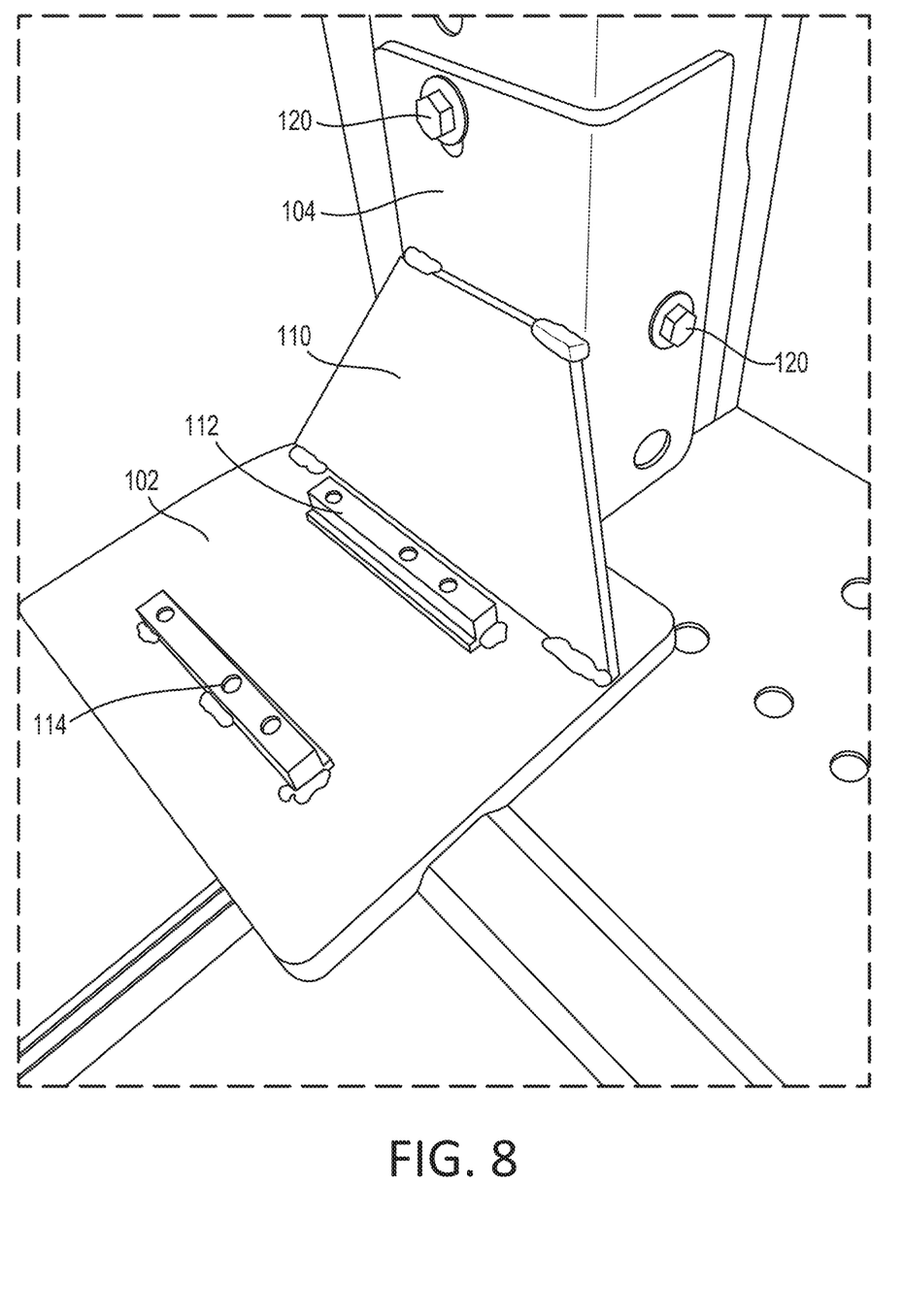
FIG. 8 is a perspective view of a bracket attached to a driver's side of a van in accordance with certain aspects of the invention.
Figure 9:
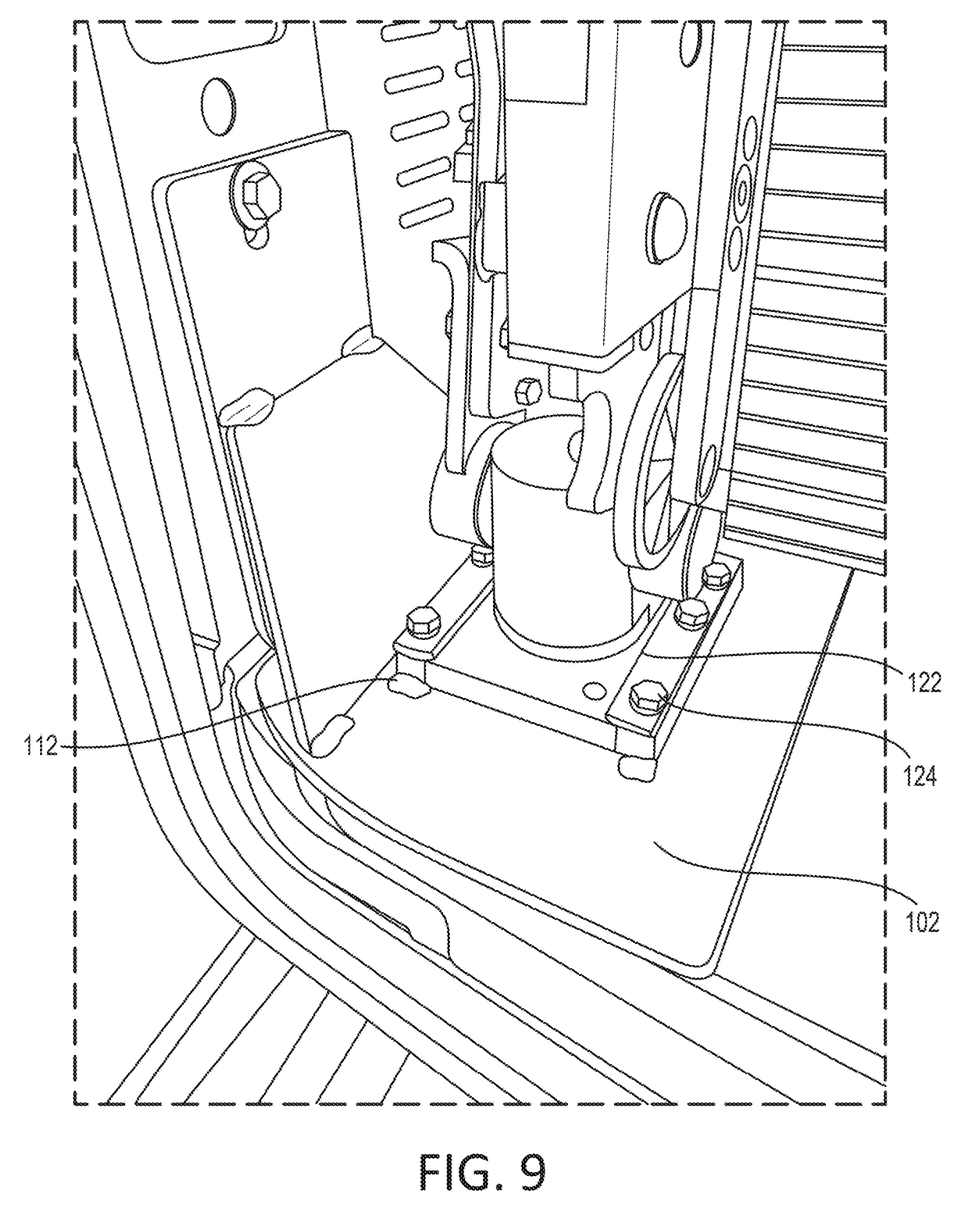
FIG. 9 is another perspective view of a bracket attached to a driver's side of a van in accordance with certain aspects of the invention.
Figure 10:
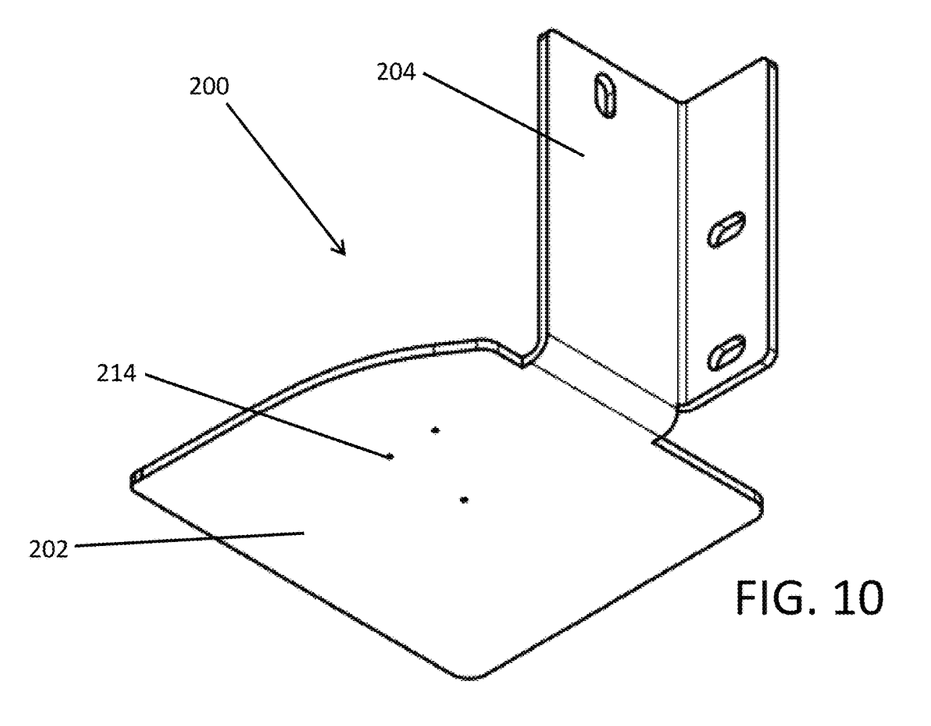
FIG. 10 is a perspective view of a bracket for attaching a loading ramp for a van to the passenger's side of the van in accordance with certain aspects of the invention.
Figure 11:
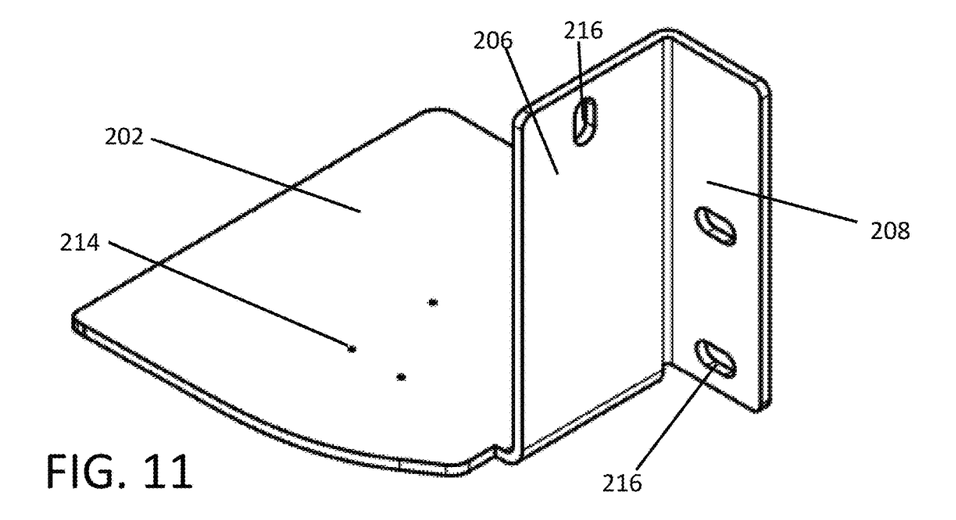
FIG. 11 is another perspective view of a bracket for attaching a loading ramp for a van to the passenger's side of the van in accordance with certain aspects of the invention.
Figure 12:
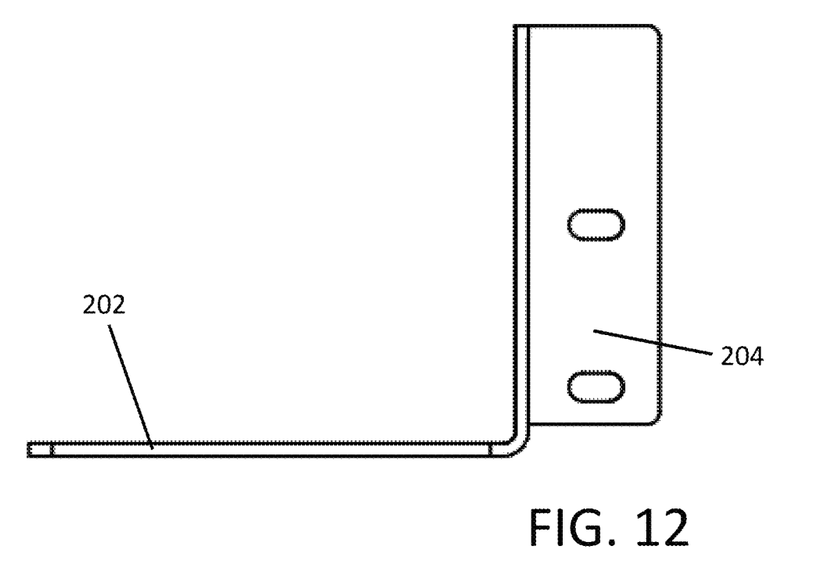
FIG. 12 is a side view of a bracket for attaching a loading ramp for a van to the passenger's side of the van in accordance with certain aspects of the invention.
Figure 13:
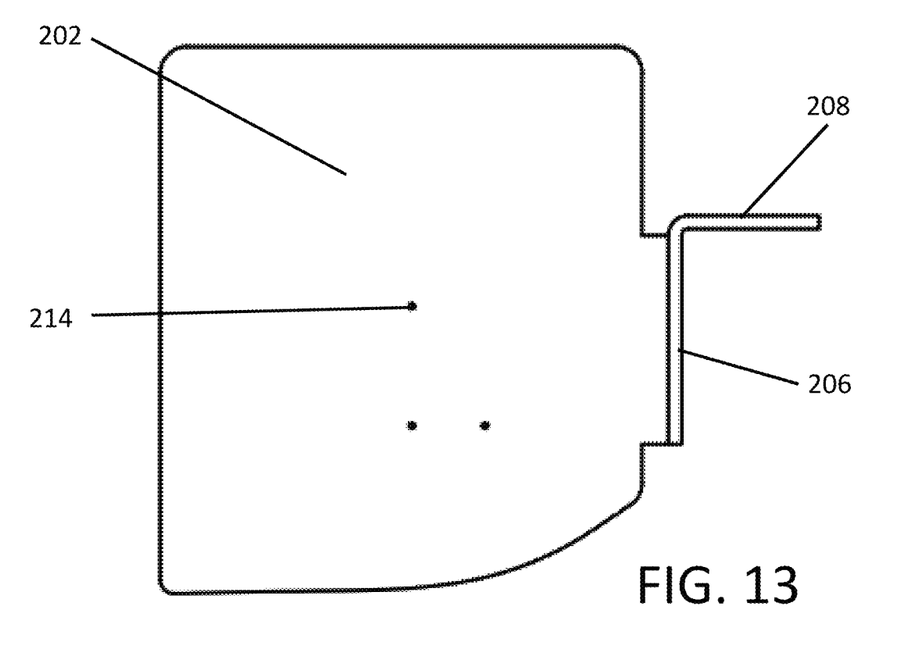
FIG. 13 is a top view of a bracket for attaching a loading ramp for a van to the passenger's side of the van in accordance with certain aspects of the invention.

A plurality of circular bores or apertures 114 are defined vertically downward from the top surface of each rail member 112. The apertures 114 are internally threaded so that other brackets or components can be fastened to the bracket 100 (e.g. with threaded fasteners such as bolts) without the need for placement of a threaded nut below the horizontal plate portion 102. This allows the horizontal plate portion 102 to rest flat atop a surface of the van such as shown in FIGS. 8-9. In alternative embodiments, a plurality of threaded nuts can be welded atop the horizontal plate portion 102 instead of, or in addition to, the rail members.

The vertical portion 104, including both the main portion 106 and the flange 108, can include a plurality of horizontally-extending apertures 116 in order to receive fastener hardware, such as threaded bolts.

Figure 1:
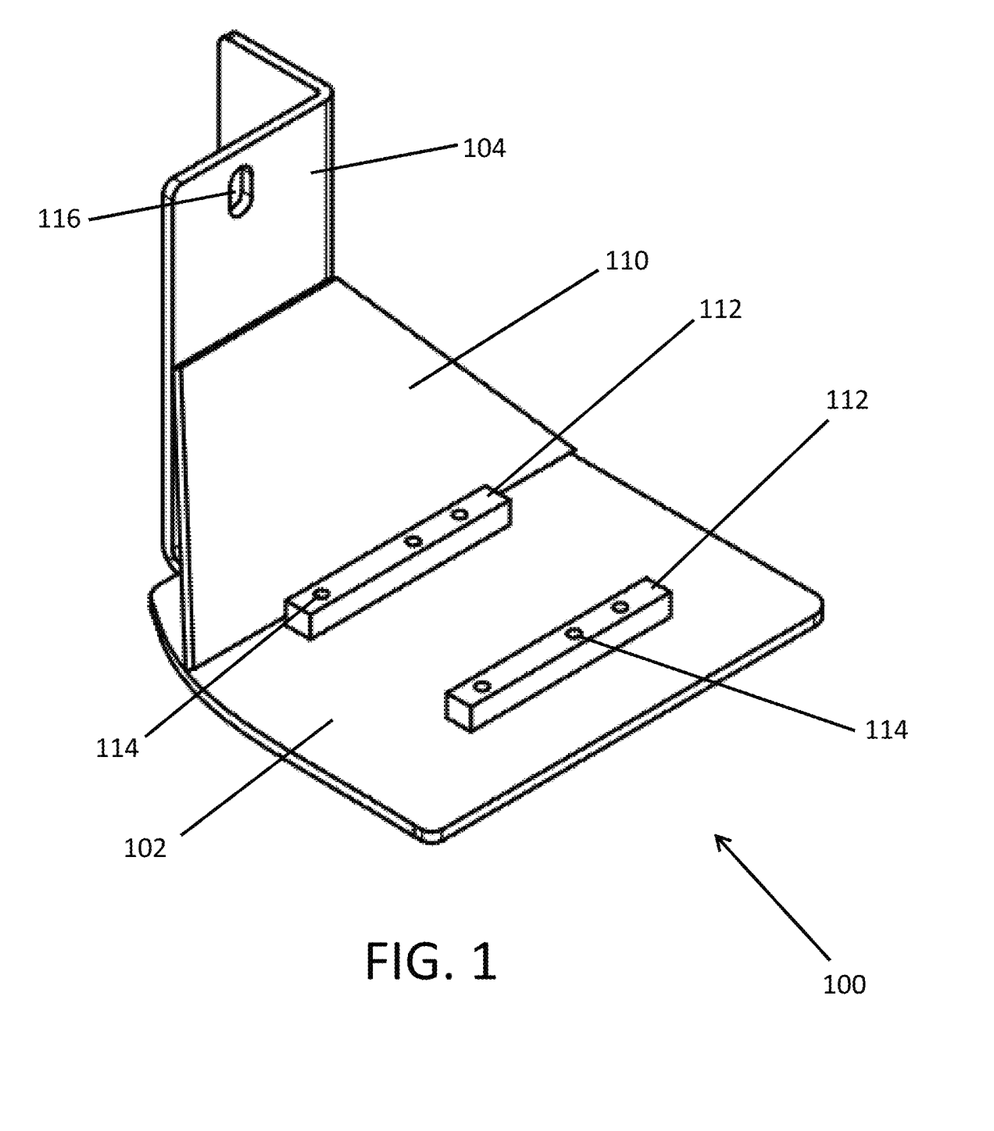
FIG. 1 is a perspective view of a bracket for attaching a loading ramp for a van to the driver's side of the van in accordance with certain aspects of the invention.
Figure 2:
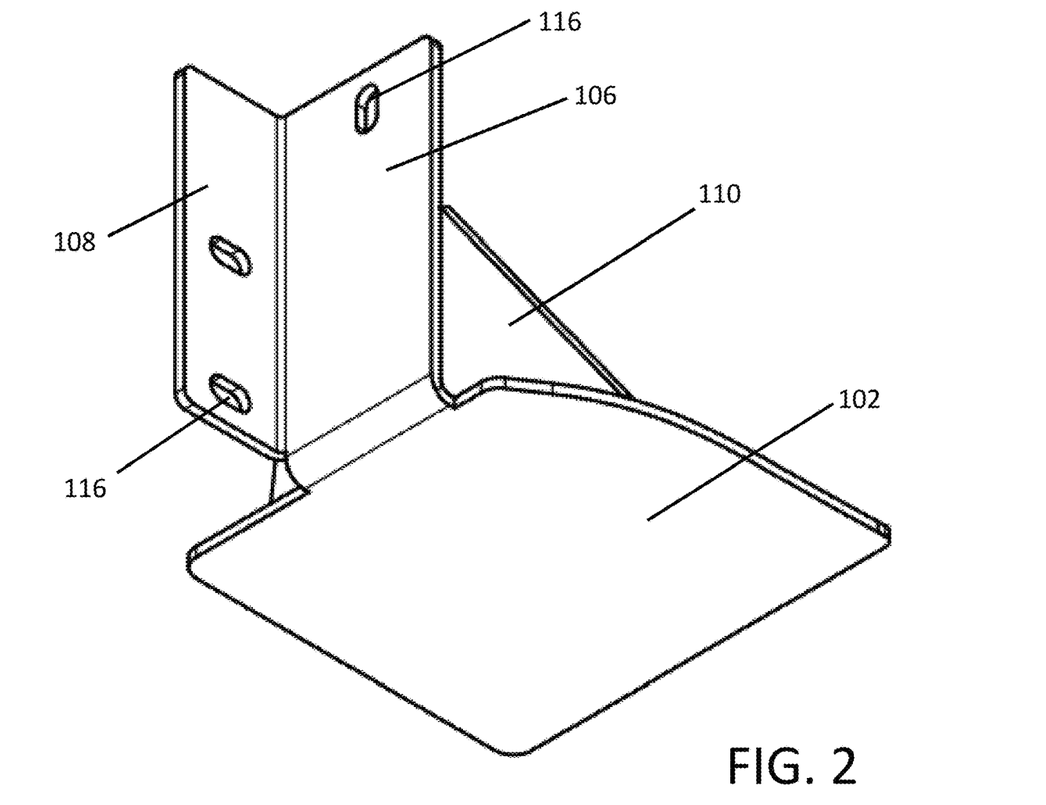
FIG. 2 is another perspective view of a bracket for attaching a loading ramp for a van to the driver's side of the van in accordance with certain aspects of the invention.
Figure 3:
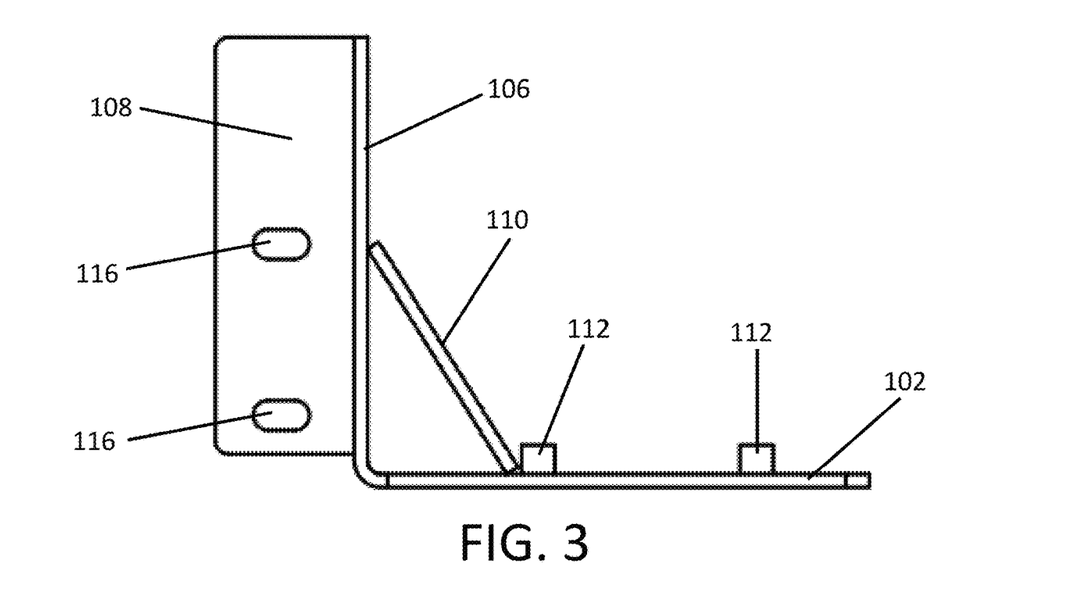
FIG. 3 is a side view of a bracket for attaching a loading ramp for a van to the driver's side of the van in accordance with certain aspects of the invention.
Figure 4:
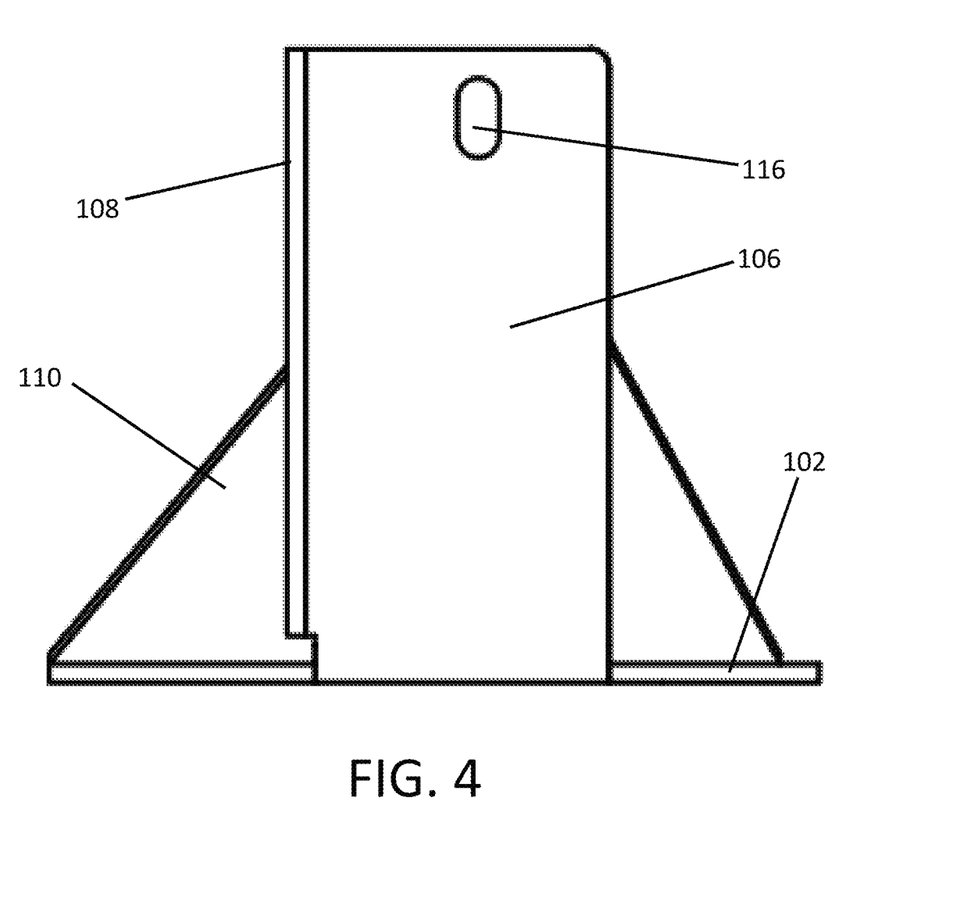
FIG. 4 is a rear view of a bracket for attaching a loading ramp for a van to the driver's side of the van in accordance with certain aspects of the invention.
Figure 5:
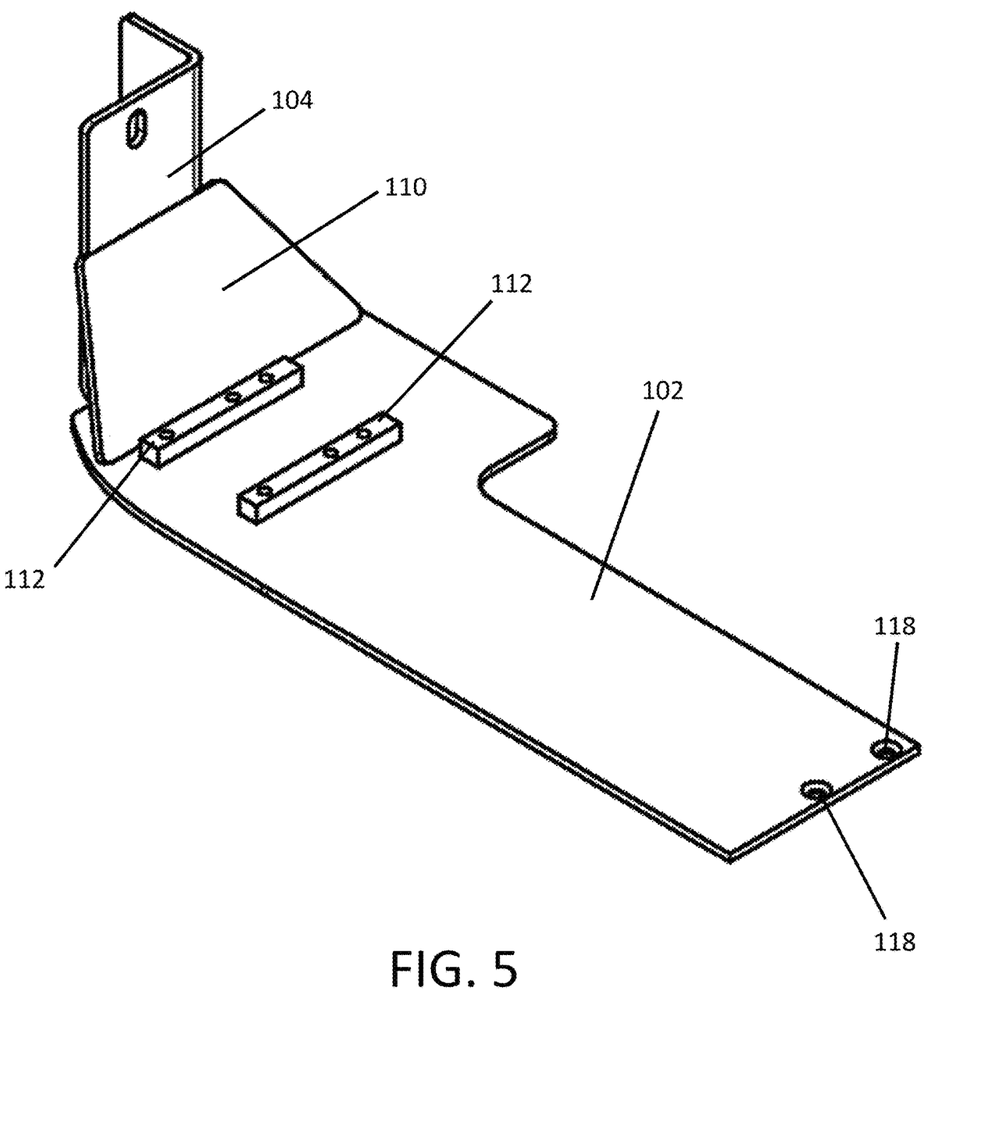
FIG. 5 is a perspective view of a bracket for attaching a loading ramp for a van to the driver's side of the van in accordance with certain aspects of the invention.
Figure 6:
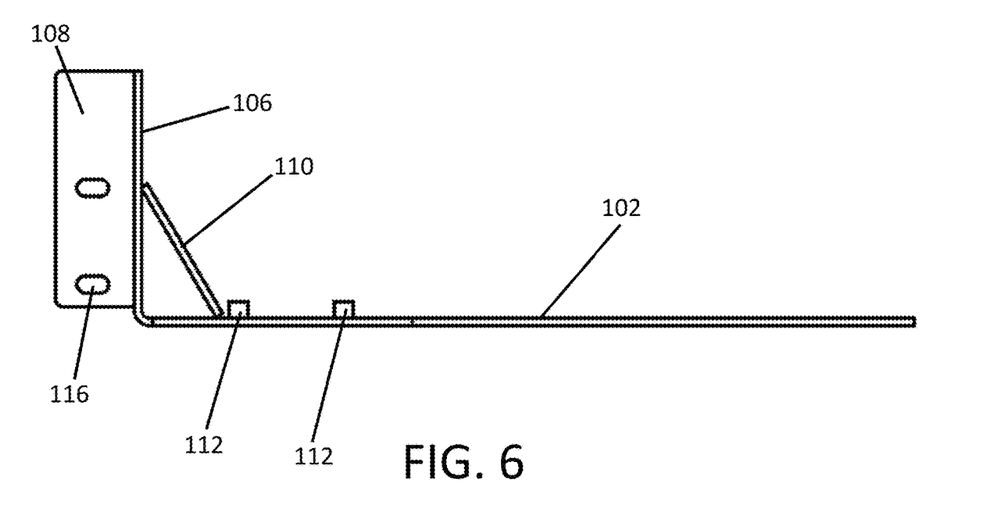
FIG. 6 is a side view of a bracket for attaching a loading ramp for a van to the driver's side of the van in accordance with certain aspects of the invention.
Figure 7:
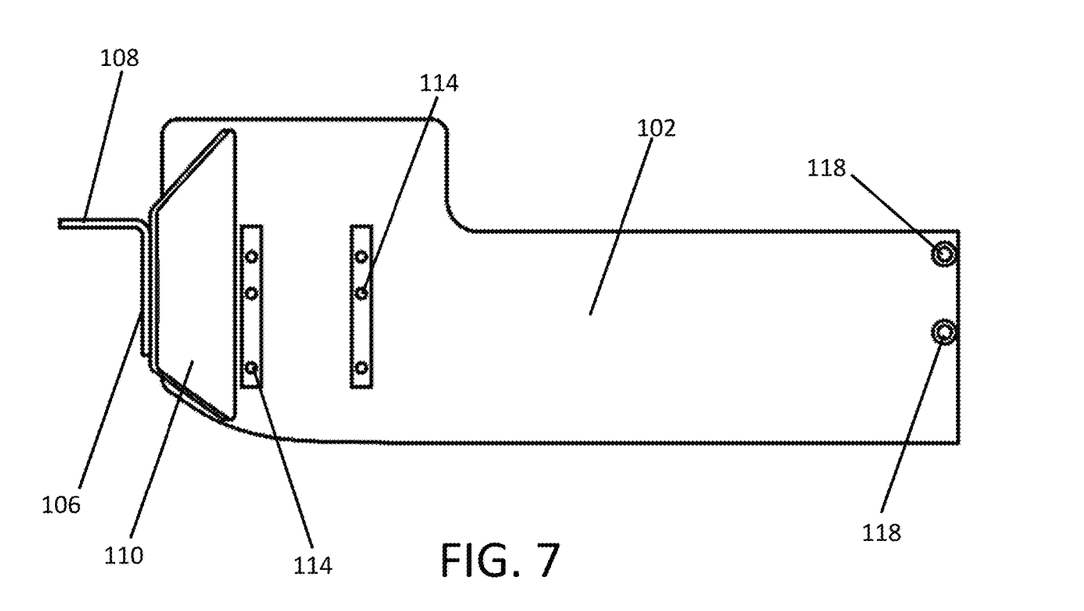
FIG. 7 is a top view of a bracket for attaching a loading ramp for a van to the driver's side of the van in accordance with certain aspects of the invention.

Referring specifically to FIGS. 5-7, a second embodiment of the bracket 100 is shown as compared to FIGS. 1-4. In the embodiment of FIGS. 5-7, the horizontal plate portion 102 is elongated with respect to that of FIGS. 1-4 so that the horizontal plate portion 102 extends farther laterally towards the center of the vehicle when installed in a van. A set of fastening apertures 118 are provided adjacent to the far lateral edge of the horizontal plate portion 102 opposite the vertical portion 104. The fastening apertures 118 align with existing threaded apertures in the van so that the bracket 100 can be further secured without the need to drill new holes in the van. Additionally, the extended horizontal plate portion 102 protects a larger portion of the van's surface from potential damage.

As can be seen from FIG. 7, the perimeter shape of the horizontal plate portion 102 is contoured and dimensioned to fit the contours of the van's door frame structure.

Referring specifically to FIGS. 8-9, the bracket 100 is shown in use fastened to the door frame of a van. Bolts 120 are shown as securing the vertical portion 104 to the vertical surface of the door frame. The apertures 116 for these bolts are located corresponding to factory holes in the door frame so that no additional holes need to be drilled into the van's structure. FIG. 9 further illustrates a bracket 122 for a ramp system secured to the pair of rails 112 with bolts 124.

Referring now to FIGS. 10-18, a bracket 200 for the passenger side of the van is shown. This bracket 200 is largely a mirror image of the driver's side bracket 100, including a horizontal plate portion 202 and a vertical portion 204.

The bottom edge of the vertical portion 204 is joined (e.g. via welding) to a horizontal side edge of the horizontal portion 202. The horizontal plate portion 202 and the vertical portion 204 can be formed of a single piece of material (e.g. metals such as steel or aluminum) that is bent at a ninety degree angle at the edge interface to define the respective portions 202, 204.

The vertical portion 204 includes a main portion 206 and a flange 208 extending from a vertical side of the main portion 206 so that the vertical portion 204 is L-shaped in top plan view. The vertical portion 204, including both the main portion 206 and the flange 208, can include a plurality of horizontally-extending apertures 216 in order to receive fastener hardware, such as threaded bolts.

Figure 17:
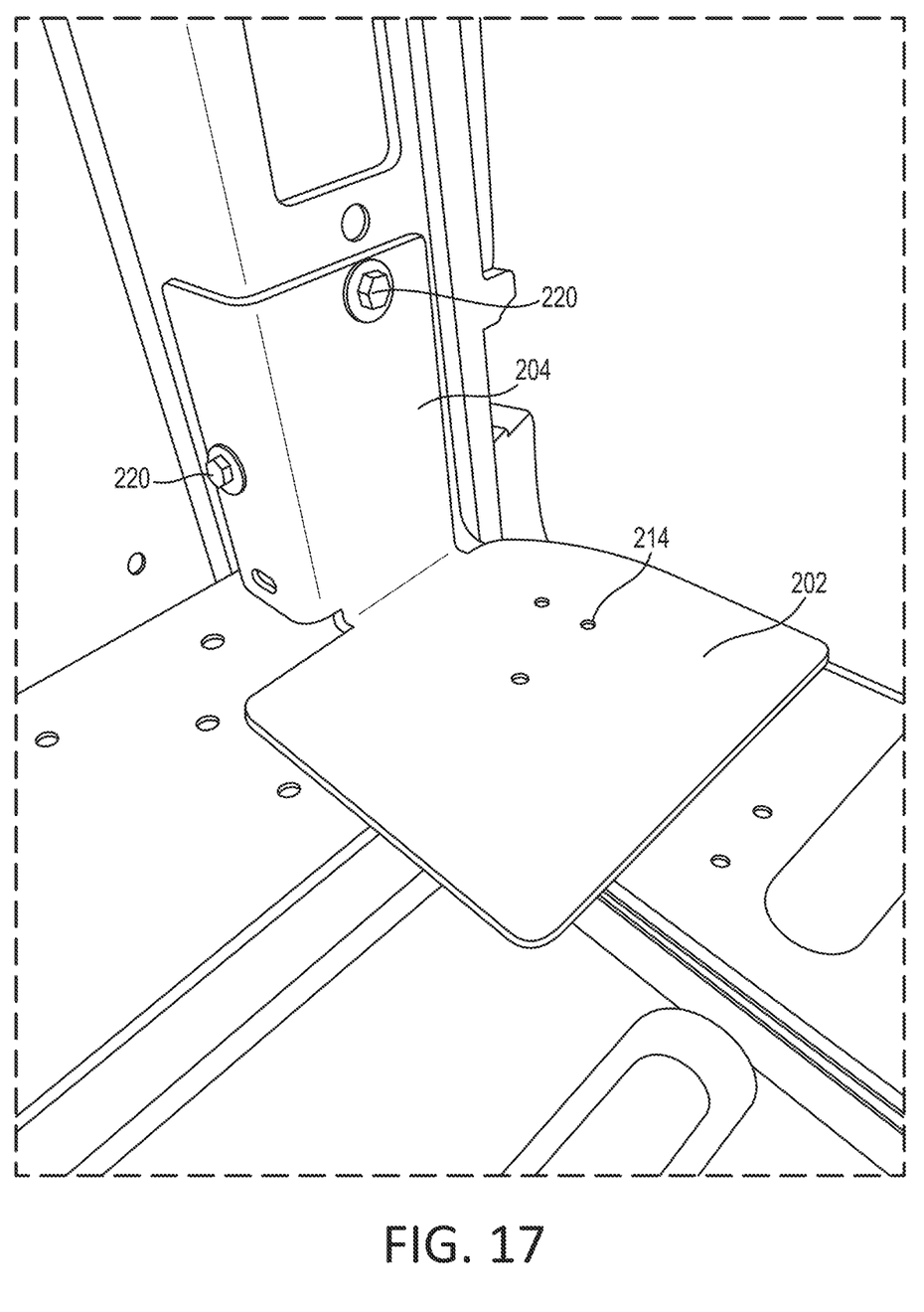
FIG. 17 is a perspective view of a bracket attached to a passenger's side of a van in accordance with certain aspects of the invention.
Figure 18:
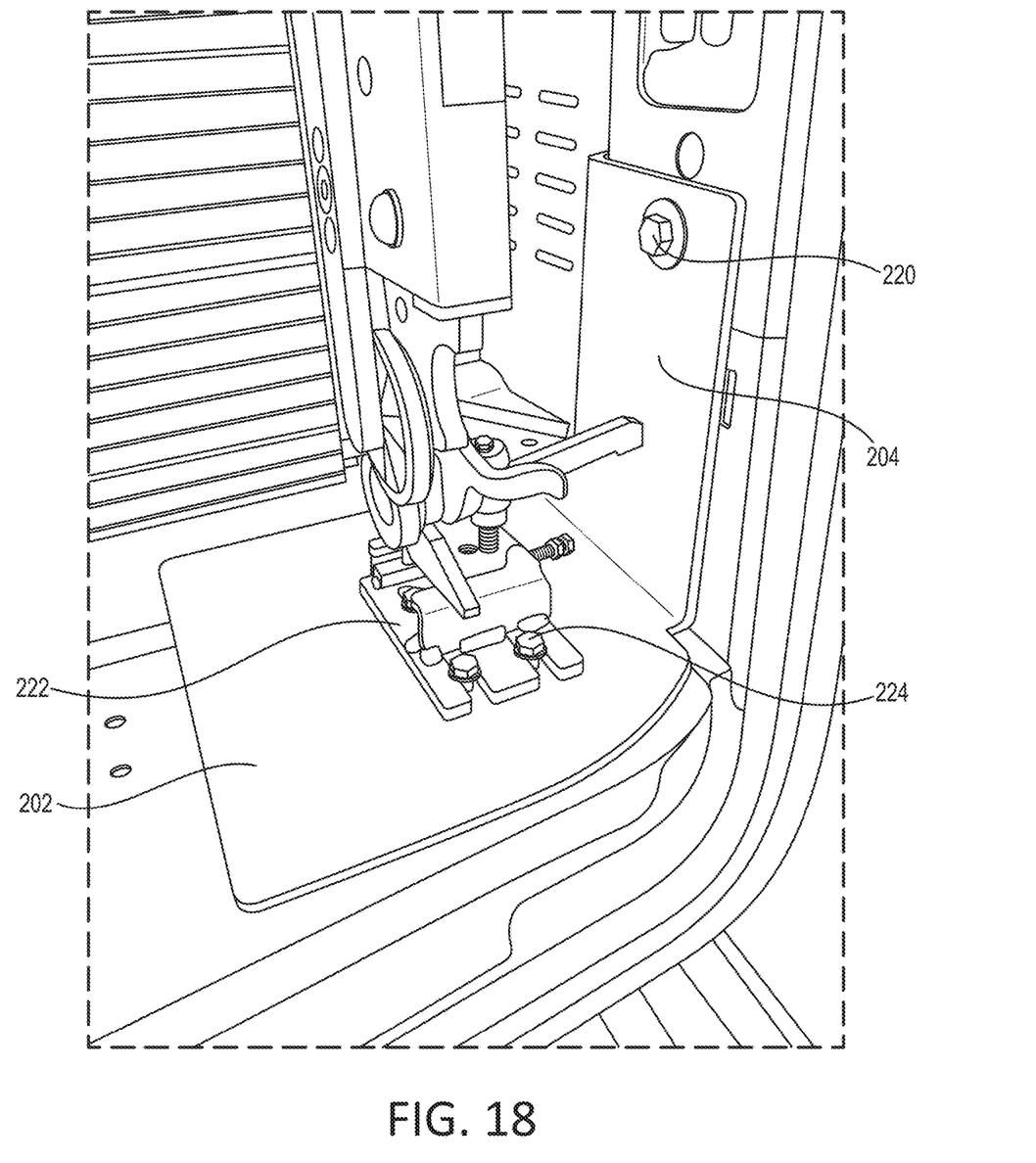
FIG. 18 is another perspective view of a bracket attached to a passenger's side of a van in accordance with certain aspects of the invention.

There are no rail members in the depicted passenger side bracket 200 embodiment. The horizontal portion 202 includes a plurality of threaded apertures 214 that are defined vertically downward from a top surface of the horizontal top plate portion 202. The apertures 214 are provided directly into the horizontal plate portion 202 versus providing rail members with internal threading. Again, this allows for bolts to be secured to the horizontal plate 202 without needing to use nuts located below the horizontal member. This allows the horizontal plate portion 202 to rest flat atop a surface of the van such as shown in FIGS. 17-18. In alternative embodiments, a plurality of rail members or threaded nuts can be welded atop the horizontal plate portion 102.

Figure 14:
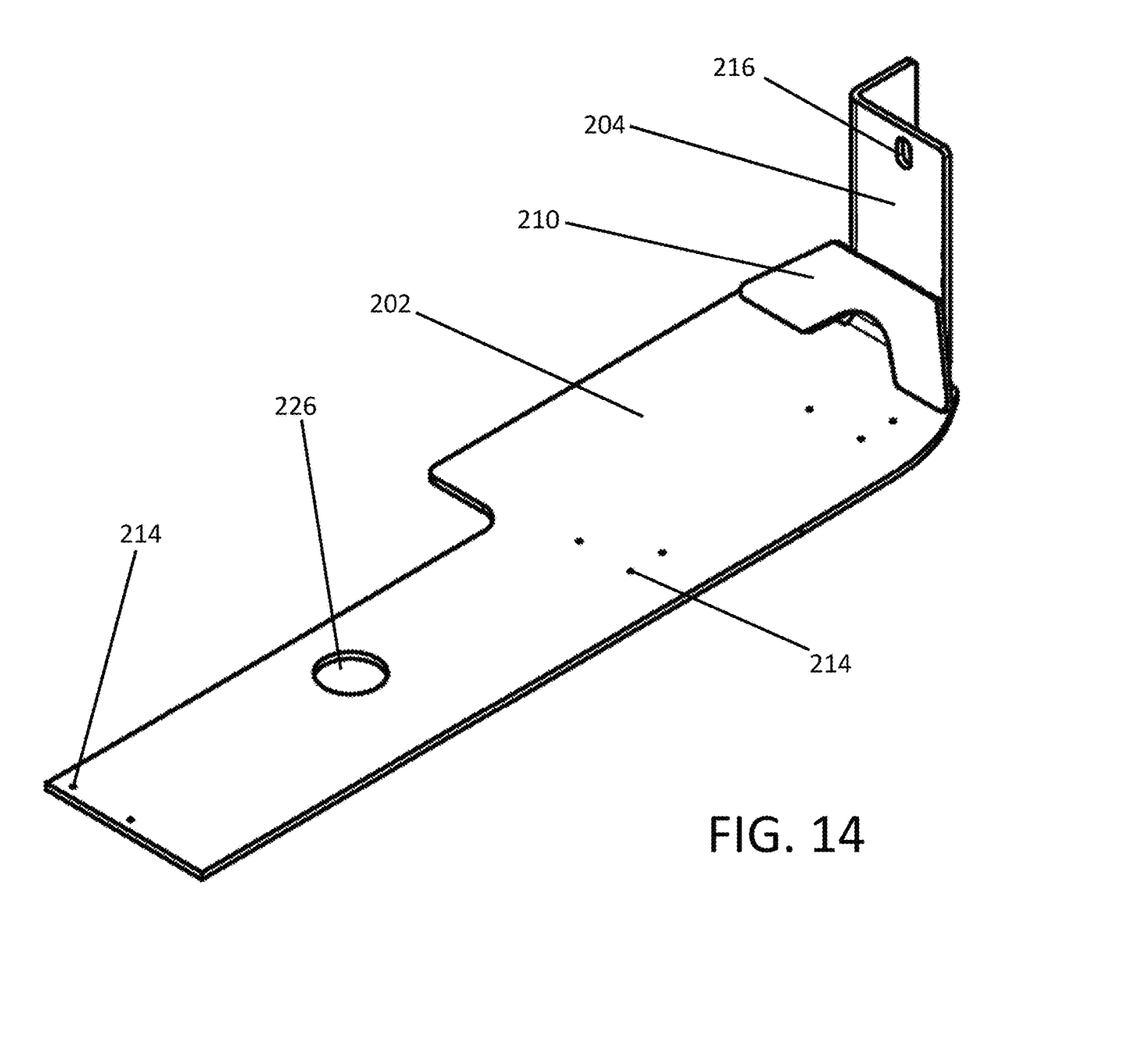
FIG. 14 is a perspective view of a bracket for attaching a loading ramp for a van to the passenger's side of the van in accordance with certain aspects of the invention.
Figure 15:
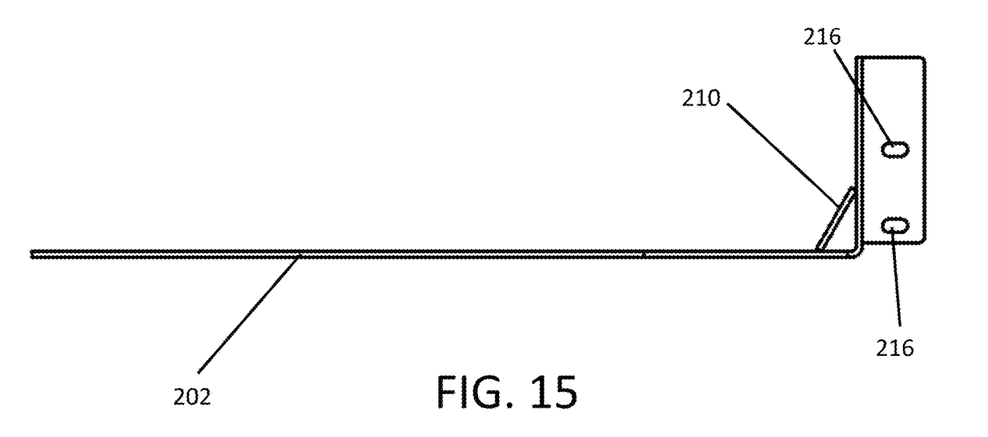
FIG. 15 is a side view of a bracket for attaching a loading ramp for a van to the passenger's side of the van in accordance with certain aspects of the invention.
Figure 16:
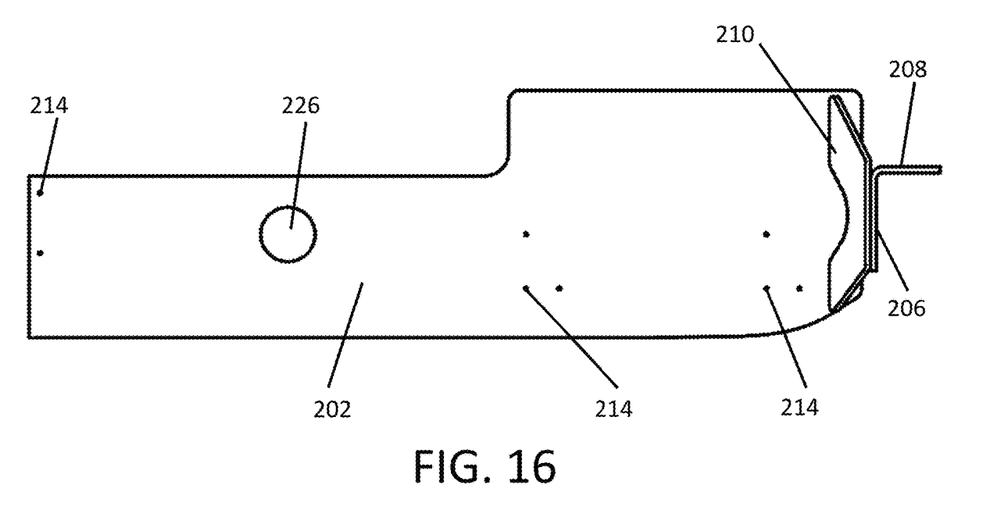
FIG. 16 is a top view of a bracket for attaching a loading ramp for a van to the passenger's side of the van in accordance with certain aspects of the invention.

Referring specifically to FIGS. 14-16, a second embodiment of the passenger side bracket 200 is shown as compared to FIGS. 10-13. In the embodiment of FIGS. 14-16, the horizontal plate portion 202 is elongated with respect to that of FIGS. 10-13 so that the horizontal plate portion 202 extends farther laterally towards the center of the vehicle when installed in a van. The extended horizontal plate portion 102 protects a larger portion of the van's surface from potential damage and provides additional fastening locations.

Additional threaded apertures 214 are defined in the horizontal plate portion 202 as compared to the embodiment of FIGS. 10-13 that are spaced farther from the vertical portion. One or more of these additional apertures 214 can be provided adjacent to the edge farthest from the vertical portion 204 such as shown in FIG. 16. These farthest apertures 214 can also be used to fasten the bracket 200 to the vehicle using existing holes in the vehicle.

A diagonal plate member 210 is provided in the embodiment of FIGS. 14-16. The diagonal plate member 210 is again attached (e.g. via welding) to the front face of the main portion 206 of the vertical portion 104 and the top surface of the horizontal plate portion 202. The diagonal plate member 210 spans between approximately the mid-height of the vertical portion 204 towards the horizontal plate portion 202 to add strength to the bracket 200.

A large aperture 226 is defined vertically through the horizontal plate portion 202. Additional relief or clearance apertures can also be defined in the horizontal plate portion 202 as necessary. As can be seen from FIG. 16, the perimeter shape of the horizontal plate portion 202 is contoured and dimensioned to fit the contours of the van's door frame structure.

Referring specifically to FIGS. 17-18, the bracket 200 is shown in use fastened to the door frame of a van. Bolts 220 are shown as securing the vertical portion 104 to the vertical surface of the door frame. The apertures 216 for these bolts are located corresponding to factory holes in the door frame so that no additional holes need to be drilled into the van's structure. FIG. 18 further illustrates a bracket 222 for a ramp system secured to the horizontal plate portion 202 with bolts 224.

The perimeter of the horizontal plate portions 102, 202 is shaped so that the door of the van can be closed without interference. The brackets 100, 200 disclosed and shown herein are shaped for use in Ford Transit vans. However, the brackets 100, 200 can be adapted to other van types as well.

The brackets can be formed of metal, such as a steel alloy or aluminum alloy. However, other rigid materials can be used.

The brackets 100, 200 can be mirrored in their configurations. Thus, the driver and passenger side designations are merely relative for purposes of disclosure. In some markets, the driver and passenger sides of vehicles are switched with respect to the United States. Thus, the driver and passenger bracket designations would be reversed in that case. The driver and passenger side configurations can also be switched depending on the configuration of the particular van.

The brackets 100 and 200 can be packaged together as part of a kit that includes mounting hardware. Installation instructions can be included in the kit as well. The kit can be combined with a loading ramp system in further embodiments.

A wide variety of loading ramps and other accessories can be secured to the brackets 100, 200. In one particular example, the present bracket system including brackets 100 and 200 can be used with a loading ramp such as that disclosed in U.S. patent application Ser. No. 17/985,658, filed Nov. 11, 2022, which is hereby incorporated herein by reference in its entirety. The brackets 100, 200 can be included with a loading ramp as part of a loading ramp system.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A bracket for mounting accessories to a rear opening of a utility van, the bracket comprising:
   a horizontal plate portion, comprising a planar surface;
   a vertical portion, the vertical portion extending vertically from a horizontal side of the horizontal plate portion, the vertical portion comprising a main portion and a flange, the flange extending horizontally from the main portion from a side edge thereof, the vertical portion comprising a plurality of fastener apertures extending horizontally therethrough to receive a male fastener; and
   a diagonal plate member spanning between the horizontal plate portion and the vertical portion,
   wherein the horizontal plate portion includes a plurality of fastening apertures vertically therethrough adjacent to a far lateral edge of the horizontal plate portion that lies opposite the vertical portion.

2. The bracket of claim 1, wherein the vertical portion is oriented perpendicular to the horizontal plate portion.

3. The bracket of claim 1, wherein the diagonal plate member is fastened to a front face of the main portion of the vertical portion and to a top surface of the horizontal plate member.

4. The bracket of claim 1, wherein the diagonal plate member forms an oblique angle with the horizontal plate portion.

5. The bracket of claim 1, wherein a plurality of threaded apertures are defined vertically in the horizontal plate portion.

6. The bracket of claim 1, further comprising:
   a first rail member secured to a top surface of the horizontal plate portion, the first rail member comprising a first elongated rectangular body; and
   a second rail member secured to a top surface of the horizontal plate portion, the first rail member comprising a second elongated rectangular body,
   wherein the first and second rail members are oriented parallel to one another.

7. The bracket of claim 6, wherein each of the first and second rail members include a plurality of threaded apertures defined vertically therein.

8. The bracket of claim 1, wherein the horizontal plate portion and the vertical portion are formed from a single plate with a bend formed at an interface between the horizontal plate portion and the vertical portion.

9. The bracket of claim 8, wherein the bend produces a ninety degree angle between the horizontal plate portion and the vertical portion.

10. A system for mounting a loading ramp to a rear opening of a utility van, the system comprising:
    a first bracket, comprising:
      a horizontal plate portion;
      a vertical portion extending vertically from a horizontal edge of the horizontal plate portion, the vertical portion including a plurality of fastener apertures extending horizontally therethrough to receive a male fastener;
      a pair of rail members secured to a top surface of the horizontal plate portion and oriented parallel to one another, each of the pair of rail members comprising an elongated rectangular body; and
      a diagonal plate member spanning between the horizontal plate portion and the vertical portion;
    a second bracket, comprising:
      a horizontal plate portion;
      a vertical portion extending vertically from a horizontal edge of the horizontal plate portion, the vertical portion including a plurality of fastener apertures extending horizontally therethrough to receive a male fastener; and
      a plurality of threaded apertures are defined vertically in the horizontal plate portion; and
    a plurality of threaded fasteners sized to be placed through the plurality of fastener apertures of the first and second brackets to secure the first and second brackets to the utility van.

11. The system of claim 10, wherein the second bracket further comprises a diagonal plate member spanning between the horizontal plate portion and the vertical portion thereof.

12. The system of claim 10, wherein each of the pair of rail members includes a plurality of threaded apertures defined vertically therein.

13. The system of claim 10, wherein the vertical portion is oriented perpendicular to the horizontal plate portion for each of the first and second brackets.

14. The system of claim 10, wherein the diagonal plate member of the first bracket is fastened to a front face of the main portion of the vertical portion and to a top surface of the horizontal plate member.

15. The system of claim 10, wherein the diagonal plate member of the first bracket forms an oblique angle with the horizontal plate portion.

16. The system of claim 10, wherein the horizontal plate portion of the first bracket includes a plurality of fastening apertures vertically therethrough adjacent to a far lateral edge of the horizontal plate portion of the first bracket that lies opposite the vertical portion of the first bracket.

17. The system of claim 10, wherein the horizontal plate portion and the vertical portion of each of the first and second brackets are formed from a single plate with a bend formed at an interface between the horizontal plate portion and the vertical portion.

18. The system of claim 17, wherein the bend produces a ninety degree angle between the horizontal plate portion and the vertical portion.

19. A method of mounting a loading ramp to a rear opening of a utility van without drilling new holes into the utility van, the method comprising:

securing a first bracket to a first vertical portion of a door frame of the utility van with a plurality of bolts placed through a vertical portion of the first bracket and extending into factory holes in the utility van, with a horizontal plate portion of the first bracket resting atop a horizontal portion of the door frame of the utility van;

securing a second bracket to a second vertical portion of a door frame of the utility van, opposite the first vertical portion of the utility van, with a plurality of bolts placed through a vertical portion of the second bracket and extending into factory holes in the utility van, with a horizontal plate portion of the second bracket resting atop the horizontal portion of the door frame of the utility van;

fastening a first bracket of a loading ramp to the first bracket via threaded fasteners placed into respective threaded apertures in a parallel pair of rail members secured to a top surface of the horizontal plate portion of the first bracket; and fastening a second bracket of a loading ramp to the second bracket via threaded fasteners placed into respective threaded apertures defined in the horizontal plate portion of the second bracket.

\* \* \* \* \*